US011972302B1

(12) United States Patent
Gabbiti et al.

(10) Patent No.: US 11,972,302 B1
(45) Date of Patent: Apr. 30, 2024

(54) USER-AWARE REQUEST PROCESSING IN APPLICATION SERVICES

(71) Applicant: INTUIT INC., Mountain View, CA (US)

(72) Inventors: Anjaneya Murthy Gabbiti, San Jose, CA (US); Fan Li Gabbett, San Jose, CA (US); Apurva Patel, Fremont, CA (US); Sujay Sundaram, San Jose, CA (US); Ajith Kuttappan Rajeswari, Mountain View, CA (US); Sanjay Channarayapatna Ramakrishna, Bangalore (IN)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 18/091,544

(22) Filed: Dec. 30, 2022

(51) Int. Cl.
*G06F 9/50* (2006.01)
*G06F 9/48* (2006.01)
*G06F 11/34* (2006.01)
*G06F 13/16* (2006.01)

(52) U.S. Cl.
CPC .............. *G06F 9/5083* (2013.01); *G06F 9/48* (2013.01); *G06F 9/4806* (2013.01); *G06F 9/4843* (2013.01); *G06F 9/485* (2013.01); *G06F 9/4856* (2013.01); *G06F 9/4875* (2013.01); *G06F 9/4881* (2013.01); *G06F 9/50* (2013.01); *G06F 9/5005* (2013.01); *G06F 9/5027* (2013.01); *G06F 9/505* (2013.01); *G06F 9/5061* (2013.01); *G06F 9/5077* (2013.01); *G06F 9/5088* (2013.01); *G06F 11/3409* (2013.01); *G06F 13/1642* (2013.01)

(58) Field of Classification Search
CPC ........ G06F 9/50; G06F 9/5005; G06F 9/5027; G06F 9/505; G06F 9/5061; G06F 9/5077; G06F 9/5083; G06F 9/5088; G06F 9/48; G06F 9/4806; G06F 9/4843; G06F 9/485; G06F 9/4856; G06F 9/4875; G06F 9/4881
See application file for complete search history.

(56) References Cited

U.S. PATENT DOCUMENTS

| 9,122,503 | B1 * | 9/2015 | Hoff | G06F 9/45558 |
| 10,838,626 | B2 * | 11/2020 | Jia | G06F 12/0871 |
| 11,271,953 | B1 * | 3/2022 | Rajagopalan | H04L 63/20 |
| 11,463,362 | B2 * | 10/2022 | Rajagopalan | H04L 63/20 |

(Continued)

*Primary Examiner* — Charles M Swift
(74) *Attorney, Agent, or Firm* — Patterson + Sheridan, LLP

(57) ABSTRACT

Certain aspects of the present disclosure provide techniques for processing computing resource access requests from users of an application service. An example method generally includes measuring computing resource access metrics over a time window for a user of a computing system. The measured computing access metrics for the user of the computing system are determined to exceed a threshold. Based on determining that the measured computing access metrics for the user of the computing system exceeds the threshold, computing resource access requests from the user of the computing system are migrated from a first queue to a second queue, wherein the first queue comprises a rate-unlimited queue and the second queue comprises a rate-controlled queue having a defined rate for processing received requests. Computing resource access requests from the user of the computing system are processed based on the defined rate for processing received requests.

20 Claims, 4 Drawing Sheets

(56) References Cited

U.S. PATENT DOCUMENTS

| | | | | |
|---|---|---|---|---|
| 2012/0142328 A1* | 6/2012 | Awoniyi | ............... | H04W 36/22 |
| | | | | 455/418 |
| 2016/0191968 A1* | 6/2016 | Buddha | ................ | H04N 21/812 |
| | | | | 725/5 |
| 2020/0301814 A1* | 9/2020 | Phaneuf | .............. | G06F 11/3612 |
| 2023/0025716 A1* | 1/2023 | Miller | ................. | H04L 63/1416 |

* cited by examiner

USER-AWARE REQUEST PROCESSING IN APPLICATION SERVICES

INTRODUCTION

Aspects of the present disclosure relate to load management in computing systems.

BACKGROUND

In many computing systems, software applications (e.g., executing on client devices) or application services that provide services to many different users may interact with remote services to perform various tasks. Some of these remote services may include remote processing services that allow for compute-intensive tasks to be performed using specialized hardware or data storage services that allow applications or application services to retrieve data from and write data to these storage services. Because these remote services are typically shared services, these shared services may perform various load balancing or management tasks in an attempt to ensure performant access for the applications or application services that use these remote services.

In many cases, remote services may be configured to process requests from applications or application services in real time. However, when the remote service determines that a particular application or application service is generating a significant amount of requests such that satisfying these requests in real time would impair the remote service's ability to satisfy requests from other application services in real time, the remote service can take various actions to delay the processing of requests from that particular application or application service. For example, the requests generated by the particular application or application service may be routed to a processing queue for delayed processing. In another example, the remote service can impose a maximum on the number of requests from the particular application or application service that will be processed over a defined period of time. In each of these cases, however, the remote services may apply these actions indiscriminately to requests received from the particular application or application service, even when an abnormal number of requests is being generated by a subset of users of the application or application service.

Accordingly, techniques are needed to fairly perform load management in computing systems.

BRIEF SUMMARY

Certain embodiments provide a computer-implemented method for processing computing resource access requests from users of an application service. An example method generally includes measuring computing resource access metrics over a time window for a user of a computing system. The measured computing access metrics for the user of the computing system are determined to exceed a threshold. Based on determining that the measured computing access metrics for the user of the computing system exceeds the threshold, computing resource access requests from the user of the computing system are migrated from a first queue to a second queue, wherein the first queue comprises a rate-unlimited queue and the second queue comprises a rate-controlled queue having a defined rate for processing received requests. Computing resource access requests from the user of the computing system are processed based on the defined rate for processing received requests.

Other embodiments provide processing systems configured to perform the aforementioned methods as well as those described herein; non-transitory, computer-readable media comprising instructions that, when executed by one or more processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
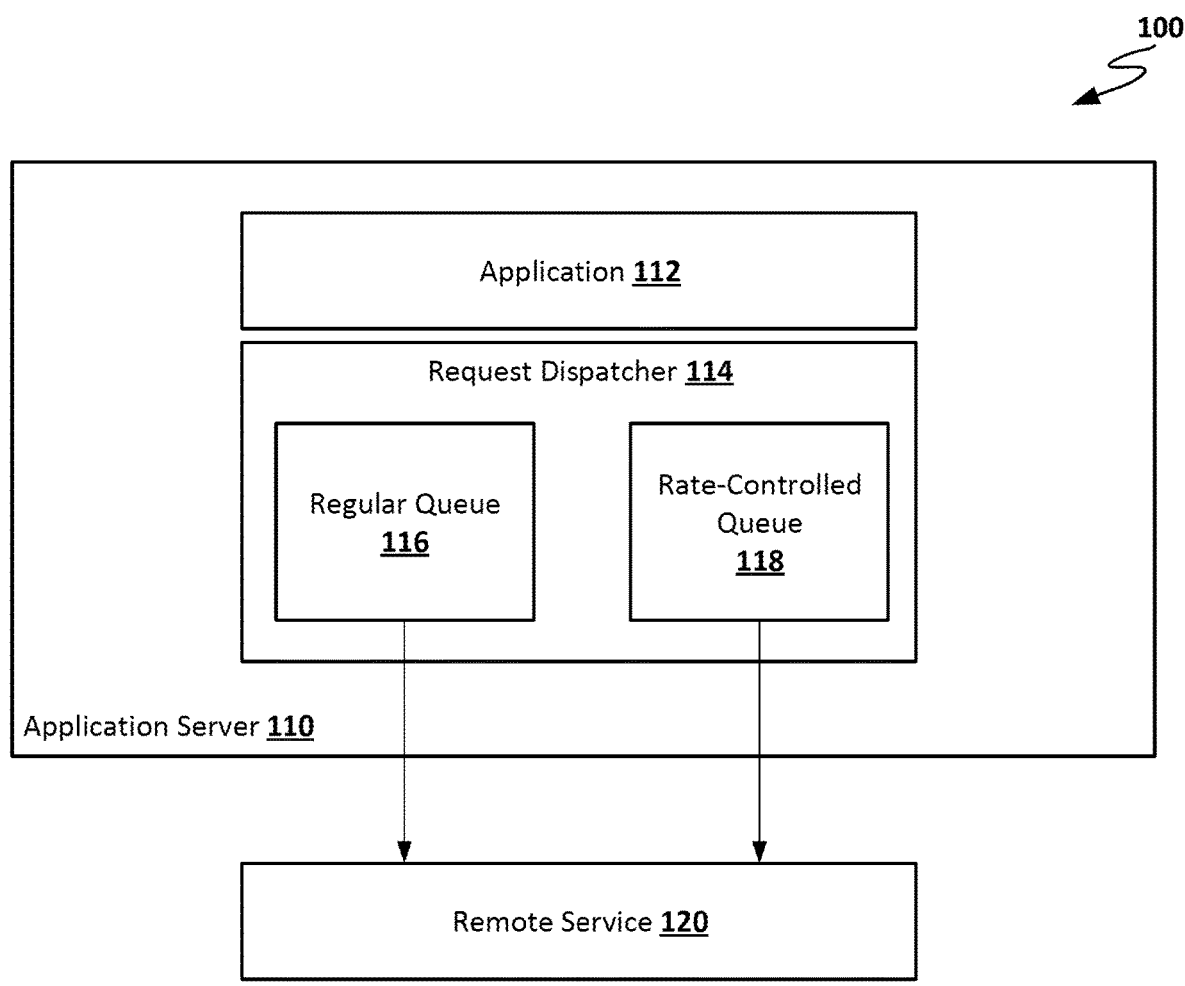
FIG. 1 illustrates an example system in which an application service performs user-based load balancing of requests to access computing resources at a remote service, in accordance with aspects of the present disclosure.

Aspects of the present disclosure provide techniques for user-based load management of requests to interact with remote services generated by an application service.

Remote services can use various techniques to perform load balancing and prevent, or at least mitigate, performance degradation due to large amounts of requests received from requesting applications or application services. For example, a remote service can throttle the rate at which requests received from a specific application service are processed, temporarily pause processing of such requests, or the like. These techniques, however, may apply to all requests received from an application or application service regardless of which user or users are associated with these requests. Thus, in situations where a small subset of users of a software application are responsible for generating a disproportionate amount of requests for processing by the remote service (e.g., due to generating a large batch of requests, etc.), the actions taken by a remote service to perform load balancing may affect both the users responsible for generating the disproportionate amount of requests for processing and other users who may not be generating unusual amounts of requests for processing. This may lead to a corresponding decrease in application performance both for users who are generating significant amounts of requests for processing by the remote service and users who are generating historically normal amounts of requests for processing by the remote service.

Aspects of the present disclosure provide techniques for user-aware load management in computing systems. As discussed in further detail herein, an application service can monitor per-user access metrics for accessing remote services through the application service. When these access metrics exceed a threshold, indicating that the user is generating a significant amount of traffic that may result in a remote service throttling or otherwise delaying the processing of requests generated by the application service, requests to access compute resources generated by the user can be migrated to a rate-controlled queue for dispatch to a compute resource (e.g., a remote service, such as a storage service or processing service which processes requests for the application service). By doing so, aspects of the present disclosure may perform load management (e.g., throttle the rate at which requests to access compute resources are processed) on a per-user basis, affecting users who are responsible for generating a significant amount of traffic while allowing for real-time, or near-real-time, processing of requests generated by other users of the application service. Thus, the performance impacts of throttling the processing of requests generated by an application service may be isolated to a subset of users of the software application, which may improve the availability and responsiveness of the application service and reduce request processing latency for users of an application service.

Example User-Based Load Balancing for Requests to Access Compute Resources at a Remote Service FIG. 1 illustrates an example environment 100 in which an application service performs user-based load balancing of requests to access computing resources at a remote service, according to aspects of the present disclosure. As illustrated, environment 100 includes an application server 110 and a remote service 120.

Application server 110 is generally representative of any computing system which can host an application accessed by external client devices and can offload various computing tasks, such as data storage or other processing tasks (e.g., training of machine learning models, inference using machine learning models, compute-intensive data analysis operations, etc.), to a remote service 120. These computing systems can include server computers, cloud compute instances, or the like. As illustrated, application server 110 hosts an application service 112 and a request dispatcher 114.

Application service 112 generally receives requests to execute various operations from client devices served by application server 110 and generates requests for compute resource access to be dispatched to remote service 120. These received requests to execute various operations may include information identifying the data set against which these operations are to be performed. In some aspects, application service 112 can receive a request to perform operations in respect of a batch of data provided by the client device, which may cause application service 112 to generate discrete requests for compute resource access for each item in the batch of data. Generally, as application service 112 receives requests to execute operations from client devices served by application server 110, application service 112 can generate corresponding requests for compute resource access and output these requests to request dispatcher 114 for dispatch to a remote service 120.

Request dispatcher 114 generally receives requests for compute resource access from application service 112 and dispatches the received requests to a remote service based on compute resource access metrics measured on a per-user basis. Generally, request dispatcher 114 can maintain a regular queue 116 and a rate-controlled queue 118 in which received requests for compute resource access are stored for dispatch to the remote service 120. Generally, regular queue 116 may output requests for processing in real-time, or as such requests are received from application service 112, while rate-controlled queue 118 may be a rate-controlled queue that limits the dispatch of requests for compute resource access to a limited rate so that the remote service 120 does not perform user-unaware, indiscriminate load balancing on requests received from application service 112.

Generally, requests for compute resource access from application service 112 may be initially routed to regular queue 116 for dispatch to the remote service 120 for real-time, or near-real-time, processing. In order to prevent remote service 120 from performing user-unaware, indiscriminate load balancing on requests received from application service 112, remote dispatcher 114 can monitor or measure various metrics associated with the processing of these requests for compute resource access on a per-user basis. If the monitored or measured metrics for a specific user of application service 112 exceed defined thresholds, request dispatcher 114 can determine that currently pending requests for the specific user as well as future requests should be processed via rate-controlled queue 118 instead of regular queue 116 so that remote service 120 does not perform load-balancing operations with respect to requests received from application service 112 as a whole.

In one example, request dispatcher 114 can monitor the number of requests received for processing from each user of application service 112 over a moving time window. If the number of requests received for processing from a user exceeds a threshold number of requests within the time window, request dispatcher 114 can determine that the measured computing access metrics for the user of the computing system exceeds the threshold and thus that requests for the user should be migrated from regular queue 116 to rate-controlled queue 118 for further processing.

In another example, request dispatcher 114 can monitor request processing performance to determine whether requests associated with a specific user of application service 112 should be migrated to rate-controlled queue 118. The monitored request processing performance may be, for example, a latency between receipt of the request at request dispatcher 114 and receipt of a response from remote service 120 indicating that the request has been processed. In such a case, monitored performance below a threshold amount of time may indicate that the requests generated for a user by application service 112 are being executed within an acceptable amount of time and thus that requests associated with that user may continue to be routed to regular queue 116 for processing. If, however, requests generated for a user by application service 112 have a measured performance above the threshold amount of time, a counter of long-latency requests may be incremented (e.g., to account for delays caused by network connectivity issues or the like). When the counter exceeds a threshold value, indicating that requests generated for the user are consistently being delayed, request dispatcher 114 can determine that the requests generated for the user of application service 112 should be throttled, and the extant and future requests associated with the user of application service 112 are migrated from regular queue 116 to rate-controlled queue 118 for further processing.

Request dispatcher 114 can continue to monitor compute resource access metrics after requests for a user of application 112 have been migrated from regular queue 116 to rate-controlled queue 118 to determine when to allow future requests associated with the user to be migrated back to regular queue 116. By doing so, request dispatcher 114 can impose request processing limitations on requests associated with a specific user of application service 112 when such limitations are needed in order to prevent remote service 120 from indiscriminately throttling or limiting requests generated by application service 112 but may allow for future requests associated with the user to be performed in real-time (e.g., as such requests are received). For example, request dispatcher 114 can impose request processing limitations on a large batch of requests generated by a user of application service 112, but need not impose such limitations on subsequent requests that are not part of a batch for which the rate at which such requests are to be dispatched to remote service 120 should be controlled.

For example, request dispatcher 114 can monitor the number of pending requests in rate-controlled queue 118 on a per-user basis. When the number of pending requests in rate-controlled queue 118 for a specific user of application service 112 falls to zero, request dispatcher 114 can determine that the user need not be subject to future rate limitations (e.g., based on an assumption that the user has completed processing a batch of requests). Thus, request dispatcher 114 can migrate the user back to regular queue 116 such that future requests received from the user are performed in real-time or near-real-time.

In another example, request dispatcher can monitor the performance of the requests in rate-controlled queue 118 to determine if the requests associated with the user of application service 112 can be migrated from rate-controlled queue 118 to regular queue 116. Generally, if the performance of a request (e.g., latency from the time at which a request was generated to the time at which a response was received from remote service 112) falls below a threshold level, request dispatcher 114 can determine that the user should no longer be subject to rate limitations imposed by rate-controlled queue 118. Thus, pending requests in rate-controlled queue 118 for the user of application service 112 can be migrated from rate-controlled queue 118 to regular queue 116, and subsequently received requests from application service 112 for the user may be processed via regular queue 116.

In some aspects, request dispatcher 114 can use a timer to determine when to measure compute resource access metrics and determine whether to migrate requests associated with a user from rate-controlled queue 118 to regular queue 116. When the timer expires, request dispatcher 114 can measure compute resource access metrics (e.g., as discussed above) and determine whether to migrate these requests. If a determination is made to continue processing requests associated with the user via rate-controlled queue 118, request dispatcher 114 can reset the timer and repeat this process at the next expiry time for the timer.

Regular queue 116 and rate-controlled queue 118 generally provide queues, or first-in, first-out, structures for dispatching requests from application server 110 to remote service 120. Regular queue and rate-controlled queue 118 may operate in parallel, or substantially in parallel, such that dispatch of requests from one of regular queue 116 or rate-controlled queue 118 to remote service 120 is not dependent on the dispatch of requests from the other of regular queue 116 or rate-controlled queue 118. Generally, regular queue 116 may dispatch requests for processing to remote service 120 in real-time or near-real time such that requests are dispatched when received from application service 112 or as such requests reach the head of the queue. In contrast, rate-controlled queue 118 may control the rate at which requests are pushed out of the queue for processing so that remote service 120 does not impose throttling or other load limitations on a user-indiscriminate basis for requests generated by application service 112. For example, rate-controlled queue 118 can monitor an amount of load, or stress, on remote service 120 that may be caused by requests originating from application service 112. Generally, the rate at which rate-controlled queue 118 pushes requests out to remote service 120 for processing may be adjusted based on the monitored load on remote service 120 caused by application service 112. As the load on remote service 120 caused by application service 112 increases, the rate at which rate-controlled queue 118 pushes requests to remote service 120 for processing may decrease.

While one rate-controlled queue 118 is illustrated in FIG. 1 and may be shared across users of application service 112, it should be recognized that multiple rate-controlled queues 118 may be established. In one example, different rate-controlled queues 118 may be established on a per-user basis or per-user-type basis (e.g., based on the historical size of batch requests generated by users of a software application). In another example, different rate-controlled queues 118 may be established with different rates at which requests are pushed to remote service 120. Requests for different users may be routed to different rate-controlled queues 118 based, for example, on the size of data to be processed by remote service 120 for each request (e.g., with larger data sizes being associated with slower queues), a quality of service metric for different users (e.g., such that requests associated with users with more demanding quality of service requirements are routed to faster queues), or the like.

Figure 2:
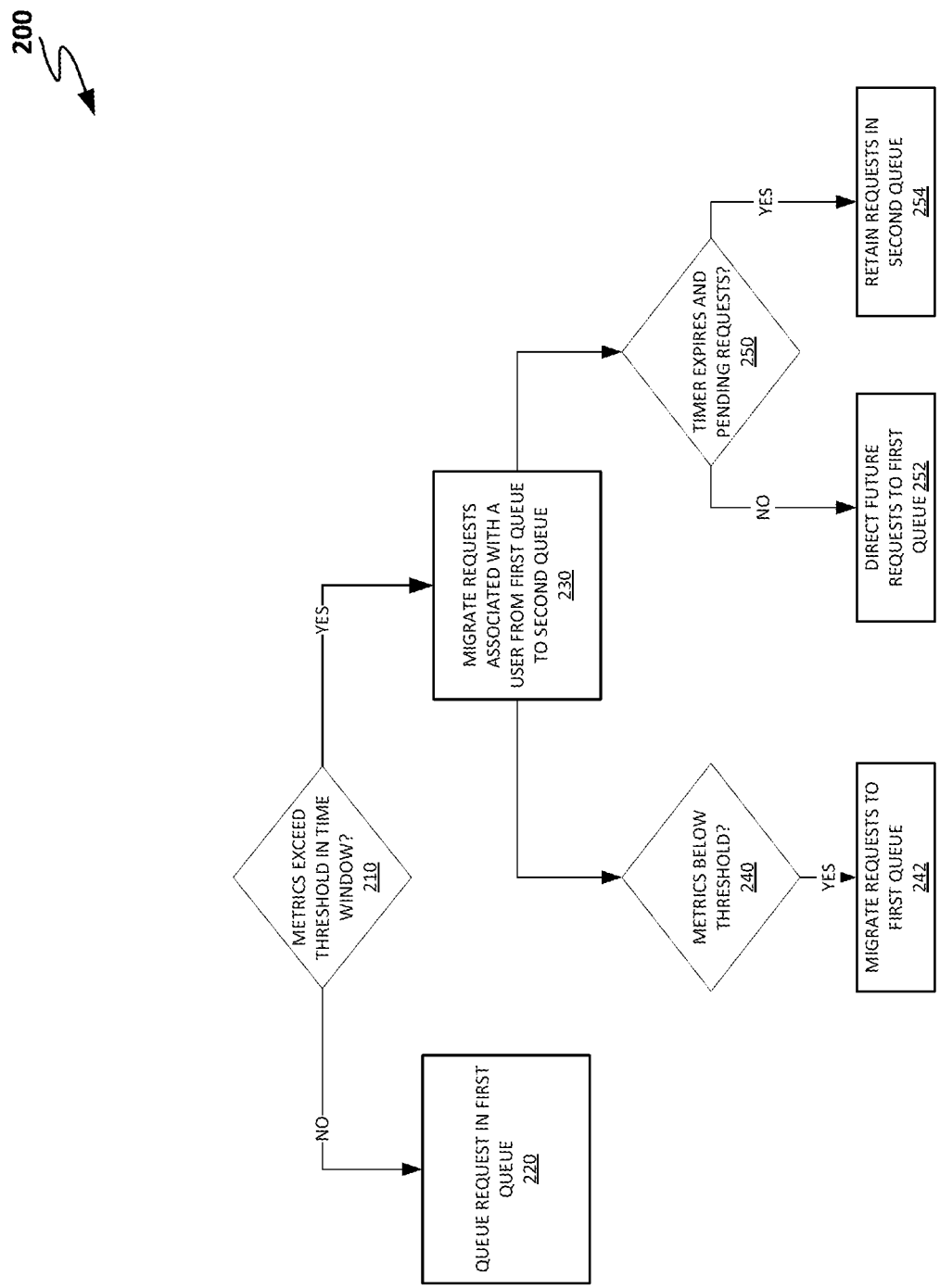
FIG. 2 is a flow chart illustrating a process for performing user-based load balancing of requests to access computing resources at a remote service, in accordance with aspects of the present disclosure.

Example Process for User-Based Load Balancing for Requests to Access Compute Resources at a Remote Service FIG. 2 is a flow chart illustrating a process 200 for performing user-based load balancing of requests to access computing resources at a remote service, in accordance with aspects of the present disclosure. Process 200 may be performed, for example, by a request dispatcher associated with an application service, such as request dispatcher 114 illustrated in FIG. 1.

As illustrated, process 200 begins at block 210, where compute resource access metrics are measured, and it is determined whether the compute resource access metrics exceed a threshold value within a time window. As discussed, the compute resource access metrics may be measured and monitored on a per-user basis so that requests generated by users responsible for a disproportionate amount of traffic are migrated to a rate-controlled queue for processing, while requests generated by other users are routed to a regular queue for real-time, or near-real-time, processing. The measured compute resource access metrics may include, for example, the number of requests received from a user within the time window, measured latency of requests, or other metrics that may indicate that a user is generating a disproportionate amount of requests for processing by the remote service that, if left unchecked, may cause the remote service to throttle or otherwise apply load balancing techniques to requests generated by the application service on a user-unaware basis.

If, at block 210, it is determined that the compute resource access metrics are less than a threshold value, then process 200 may proceed to block 220. At block 220, incoming requests for the user are queued in a first queue (e.g., regular queue 116 illustrated in FIG. 1) for dispatch to the remote service. The first queue, in some aspects, may be a rate-unlimited queue in which requests are dispatched for processing by the remote service as requests reach the head of the queue (e.g., in real-time, as such requests are received, or near-real-time).

If, however, at block 210, it is determined that the compute resource access metrics exceed the threshold value, then process 200 may proceed to block 230. At block 230, requests associated with a user incoming requests for the user are queued in a second queue. The second queue may, in some aspects, be a rate-limited queue (e.g., rate-controlled queue 118 illustrated in FIG. 1) which limits the number of requests dispatched to a remote service to a defined number of requests over a period of time.

After a user is migrated, at block 230, to the second queue, subsequent requests associated with that user may be routed to the second queue until the user is migrated back to the first queue. To determine whether to migrate a user from the second queue to the first queue, as illustrated, two parallel operations may be performed. At block 240, current compute resource access metrics for the user may be compared to a threshold. As discussed, these compute resource access metrics may include, for example, the number of requests received from a user within the time window, measured latency of requests, or other metrics that may indicate that a user is generating a disproportionate amount of requests for processing by the remote service that, if left unchecked, may cause the remote service to throttle or otherwise apply load balancing techniques to requests generated by the application service on a user-unaware basis. If, at block 240, it is determined that the current compute resource access metrics remain above the threshold value, no action may be taken, and subsequent requests associated with the user of an application service may continue to be routed to the second queue for processing. If, however, at block 240, it is determined that the current compute resource access metrics have fallen below the threshold value, it may be determined that the user is no longer generating requests that may cause the remote service to throttle requests generated by the application service on a user-unaware basis. Thus, at block 242, requests associated with the first user may be migrated back to the first queue for processing.

Additionally, at block 250, at expiry of a timer, the second queue may be examined for pending requests associated with the user of the application service. If no requests are pending in the second queue for the user of the application service, it may be determined that the user has completed generating requests and thus that subsequent requests associated with the user need not be subject to the rate limitations previously applied to requests associated with the user. Thus, at block 252, requests associated with the user may be directed to the first queue for processing in real-time or near-real-time. Otherwise, at block 254, requests associated with the user may be retained at the second queue for rate-controlled dispatch to the remote service.

Figure 3:
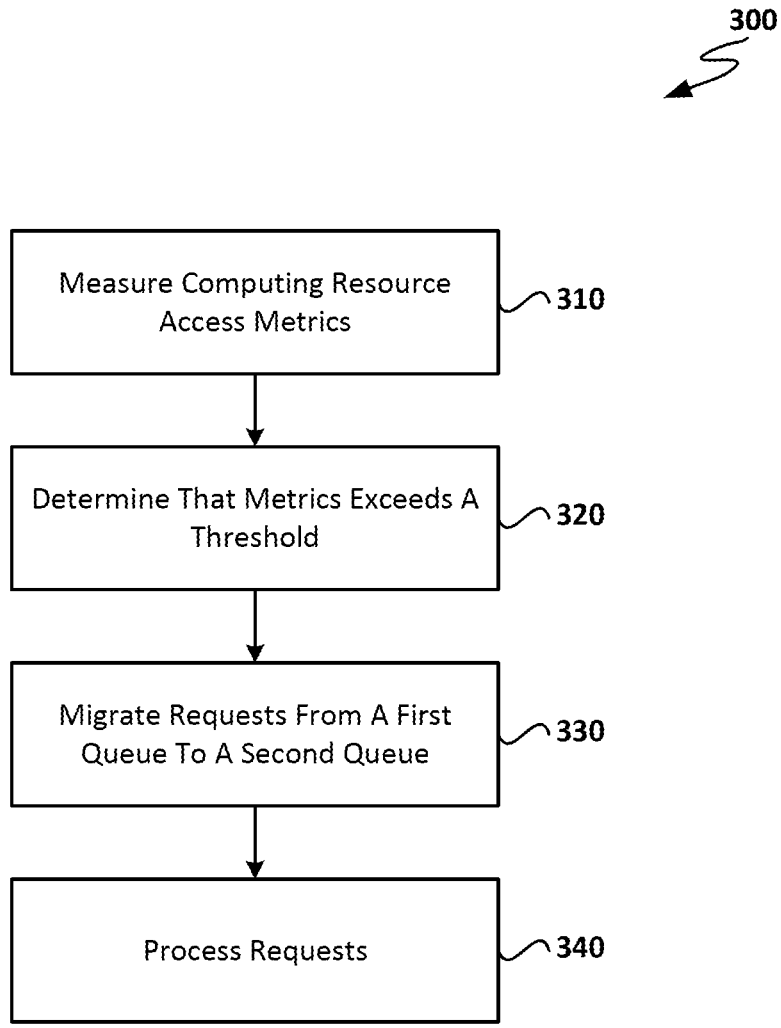
FIG. 3 illustrates example operations that may be performed by a computing system to perform user-based load balancing of requests to access computing resources at a remote service, in accordance with aspects of the present disclosure.

Example Computer-Implemented Method for User-Based Load Balancing for Requests to Access Compute Resources at a Remote Service FIG. 3 illustrates example operations 300 for performing user-based load balancing of requests to access computing resources at a remote service, according to aspects of the present disclosure. Operations 300 may be performed by a request processor associated with an application service, such as request processor 114 illustrated in FIG. 1.

As illustrated, operations 300 begin at block 310, where computing resource access metrics are measured over a time window for a user of a computing system. In some aspects, measuring computing resource access metrics over the time window for the user of the computing system comprises measuring one or more of a number of computing resource access requests received for the user or a processing time for each computing resource access request.

At block 320, operations 300 proceed with determining that the measured computing access metrics for the user of the computing system exceeds a threshold. Generally, the threshold value may be a value that indicates that a user is generating a disproportionate amount of requests for to access various computing resources and such that if the user is allowed to continue to generate such requests for processing in real time or near-real-time, the remote service on which the requested computing resources are located may apply load balancing or other throttling techniques to requests generated by the application service regardless of which user is responsible for generating these requests.

In some aspects, determining that the measured computing access metrics for the user of the computing system exceeds the threshold may be based on at least one of the number of requests received from a user during the time window or the processing time associated with these requests received from the user during the time window. For example, determining that the measured computing access metrics for the user exceeds the threshold may include determining that the number of computing resource access requests received for the user exceeds a threshold number of requests over the time window. In another example, determining that the measured computing access metrics for the user exceeds the threshold may include determining that a number of computing resource access requests having a processing time exceeding a threshold time exceeds a threshold number of long-latency requests over the time window.

At block 330, operations 300 proceed with migrating computing resource access requests from the user of the computing system from a first queue to a second queue based on determining that the measured computing access metrics for the user of the computing system exceeds the threshold. The first queue may be a rate-unlimited queue in which requests are dispatched to the remote service as such requests are received. The second queue may be a rate-controlled queue having a defined rate for processing received requests. The second queue may be shared amongst multiple users of the application service. The defined rate may be a dynamically adjustable rate based on the measured computing access metrics for the user of the computing system and computing system utilization information.

In some aspects, migrating access computing resource access requests from the user of the computing system from the first queue to the second queue comprises migrating the computing resource access requests for a duration associated with a timer. At expiry of the timer, the second queue may be examined to determine if any requests are still pending for the user. If the second queue is empty (e.g., with respect to the user), computing resource access requests from the user of the computing system may be migrated back from the second queue to the first queue based on such a determination. If, however, at expiry of the timer, requests are pending for the user in the second queue, processing of computing resource access requests from the user of the computing system may be maintained through the second queue at least until the next expiry time for the timer.

At block 340, operations 300 proceed with processing computing resource access requests from the user of the computing system based on the defined rate for processing received requests. In some aspects, received computing resource access requests from other users of the computing system may be processed as requests from the other users are received in the first queue while the computing resource access requests from the user are processed based on the defined rate for processing received requests.

In some aspects, operations 300 may further include determining that the measured computing resource access metrics have fallen below the threshold. Computing resource access requests from the user of the computing system may be migrated back from the second queue to the first queue based on determining that the measured computing resource access metrics have fallen below the threshold.

Figure 4:
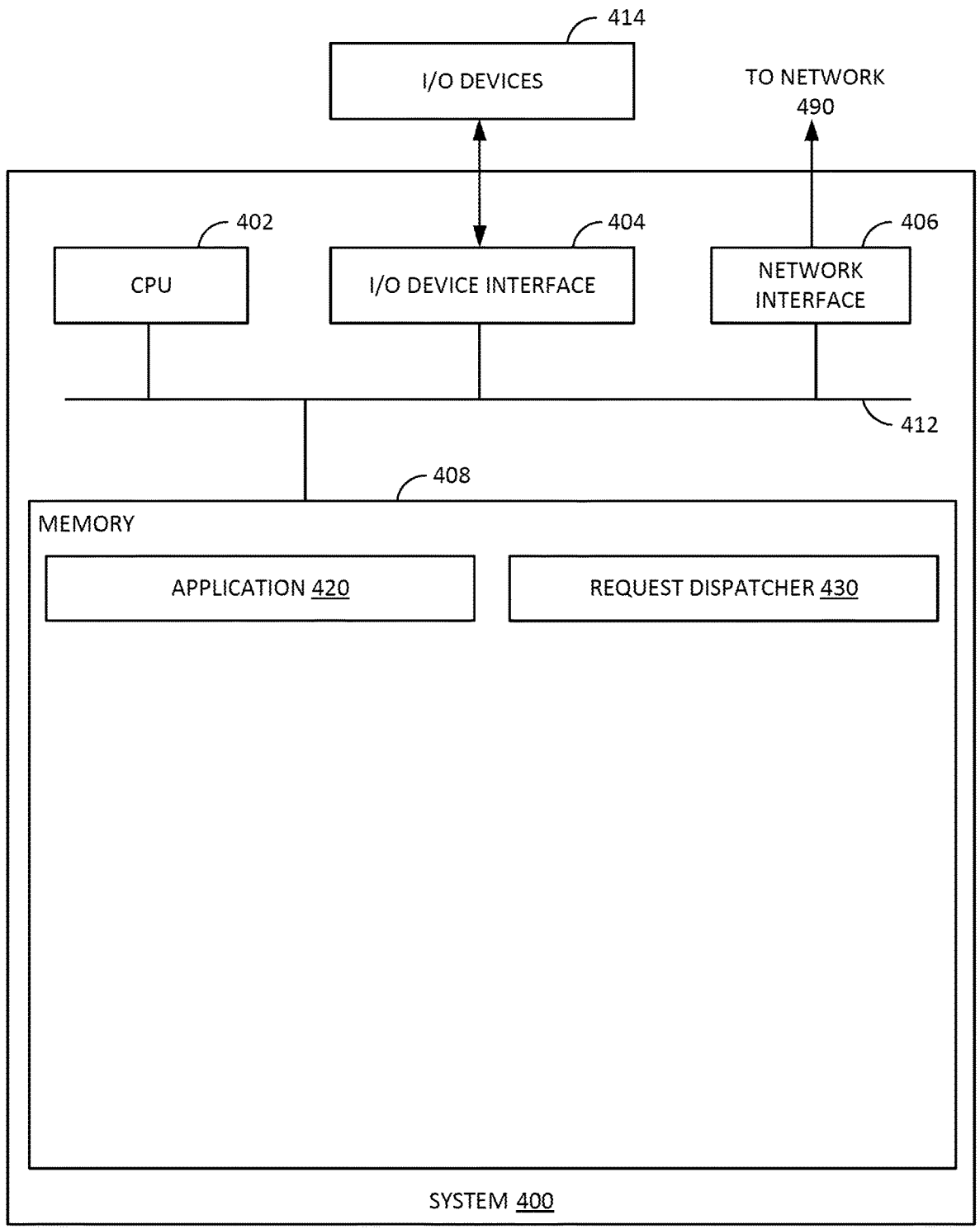
FIG. 4 illustrates a computing system on which aspects of the present disclosure may be performed.

Example System for User-Based Load Balancing for Requests to Access Compute Resources at a Remote Service FIG. 4 illustrates an example system 400 that performs user-based load balancing of requests to access computing resources at a remote service. In one example, system 400 may correspond to application server 110 illustrated in FIG. 1 or other computing devices on which computing resource access requests are received at an application service and dispatched to a remote service.

As shown, system 400 includes a central processing unit (CPU) 402, one or more I/O device interfaces 404 that may allow for the connection of various I/O devices 414 (e.g., keyboards, displays, mouse devices, pen input, etc.) to the system 400, network interface 406 through which system 400 is connected to network 490 (which may be a local network, an intranet, the internet, or any other group of computing devices communicatively connected to each other), a memory 408, and an interconnect 412.

CPU 402 may retrieve and execute programming instructions stored in the memory 408. Similarly, the CPU 402 may retrieve and store application data residing in the memory 408. The interconnect 412 transmits programming instructions and application data, among the CPU 402, I/O device interface 404, network interface 406, and memory 408.

CPU 402 is included to be representative of a single CPU, multiple CPUs, a single CPU having multiple processing cores, and the like.

Memory 408 is representative of a volatile memory, such as a random access memory, or a nonvolatile memory, such as nonvolatile random access memory, phase change random access memory, or the like. As shown, memory 408 includes an application service 420 and a request dispatcher 430.

Application service 420 may generally correspond to application service 112 illustrated in FIG. 1. Application service 420 generally exposes a service through which client devices can execute various operations which may involve requesting access to computing resources provided by a remote service. When such requests are received, application service 420 can generate requests to access these computing resources and output the requests to request dispatcher 430 for routing to the remote service, as discussed herein.

Request dispatcher 430 may generally correspond to request dispatcher 114 illustrated in FIG. 1. Request dispatcher 430 generally receives compute resource access requests from application service 420 and routes these requests to a rate-unlimited queue or a rate-controlled queue for dispatch to the remote service. Generally, requests from a user of application service 420 may be initially routed to the rate-unlimited queue for dispatch to the remote service. Various computing resource access metrics may be measured while these requests are processed via the rate-unlimited queue. If the measured metrics exceed various defined thresholds over a time window, such as a number of received requests or a number of long-latency requests having a completion time over a threshold or target completion time, request dispatcher 430 can migrate extant requests and route subsequent requests associated with a user of application service 420 to a rate-controlled queue for delayed (controlled) dispatch to the remote service. Subsequently, request dispatcher 430 can monitor the rate-controlled queue and the computing resource access metrics for the user to determine if and when the user and the requests associated with the user can be migrated back to the rate-unlimited queue for processing.

Example Clauses

Implementation details of various aspects of the present disclosure are described in the following numbered clauses.

Clause 1: A method, comprising: measuring computing resource access metrics over a time window for a user of a computing system; determining that the measured computing access metrics for the user of the computing system exceeds a threshold; based on determining that the measured computing access metrics for the user of the computing system exceeds the threshold, migrating computing resource access requests from the user of the computing system from a first queue to a second queue, wherein the first queue comprises a rate-unlimited queue and the second queue comprises a rate-controlled queue having a defined rate for processing received requests; and processing computing resource access requests from the user of the computing system based on the defined rate for processing received requests.

Clause 2: The method of Clause 1, further comprising: determining that the measured computing resource access metrics have fallen below the threshold; and migrating computing resource access requests from the user of the computing system from the second queue to the first queue based on determining that the measured computing resource access metrics have fallen below the threshold.

Clause 3: The method of any one of Clauses 1 or 2, wherein migrating access computing resource access requests from the user of the computing system from the first queue to the second queue comprises migrating the computing resource access requests for a duration associated with a timer.

Clause 4: The method of Clause 3, further comprising: at an expiry time for the timer, determining that the second queue is empty; and migrating computing resource access requests from the user of the computing system from the second queue to the first queue based on determining that the second queue is empty.

Clause 5: The method of any one of Clauses 3 or 4, further comprising: at an expiry time for the timer, determining that access requests are pending in the second queue; and maintaining processing of computing resource access requests from the user of the computing system through the second queue based on determining that access requests are pending in the second queue.

Clause 6: The method of any one of Clauses 1 through 5, wherein measuring computing resource access metrics over the time window for the user of the computing system comprises measuring a number of computing resource access requests received for the user and a processing time for each computing resource access request.

Clause 7: The method of Clause 6, wherein determining that the measured computing access metrics for the user of the computing system exceeds the threshold comprises one or more of: determining that the number of computing resource access requests received for the user exceeds a threshold number of requests over the time window; or determining that a number of computing resource access requests having a processing time exceeding a threshold time exceeds a threshold number of long-latency requests over the time window.

Clause 8: The method of any one of Clauses 1 through 7, further comprising processing received computing resource access requests from other users of the computing system as requests from the other users are received in the first queue.

Clause 9: The method of any one of Clauses 1 through 8, wherein the second queue comprises a rate-controlled queue for multiple users of the software application including the user.

Clause 10: The method of any one of Clauses 1 through 9, wherein the defined rate comprises a dynamically adjustable rate based on the measured computing access metrics for the user of the computing system and computing system utilization information.

Clause 11: An apparatus comprising: a memory having executable instructions stored thereon; and a processor configured to execute the executable instructions to cause the apparatus to perform the operations of any one of Clauses 1 through 10.

Clause 12: An apparatus comprising: means for performing the operations of any one of Clauses 1 through 10.

Clause 13: A computer-readable medium having instructions stored thereon which, when executed by a processor, performs the operations of any one of Clauses 1 through 10.

Additional Considerations

The preceding description is provided to enable any person skilled in the art to practice the various embodiments described herein. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method, comprising:
   measuring computing resource access metrics over a time window for a user of a computing system by measuring a processing time for each of a plurality of computing resource access requests received for the user;
   in response to a latency for a computing resource access request of the plurality of computing resource access requests exceeding a threshold time, incrementing a counter of long-latency requests for the user over the time window;
   determining that the counter of long-latency requests for the user over the time window a threshold number of long-latency requests;
   based on determining that the counter of long-latency requests for the user over the time window exceeds the threshold number of long-latency requests, migrating computing resource access requests from the user of the computing system from a first queue to a second queue, wherein the first queue comprises a rate-unlimited queue and the second queue comprises a rate-controlled queue having a defined rate for processing received requests; and
   processing computing resource access requests from the user of the computing system based on the defined rate for processing received requests.

2. The method of claim 1, further comprising:
   determining that a counter of long-latency requests for the user over a second time window is below the threshold number of long-latency requests; and
   migrating computing resource access requests from the user of the computing system from the second queue to the first queue based on determining that the counter of long-latency requests for the user over the second time window is below the threshold number of long-latency requests.

3. The method of claim 1, wherein migrating access computing resource access requests from the user of the computing system from the first queue to the second queue comprises migrating the computing resource access requests for a duration associated with a timer.

4. The method of claim 3, further comprising:
   at an expiry time for the timer, determining that the second queue is empty; and
   migrating computing resource access requests from the user of the computing system from the second queue to the first queue based on determining that the second queue is empty.

5. The method of claim 3, further comprising:
   at an expiry time for the timer, determining that access requests are pending in the second queue; and
   maintaining processing of computing resource access requests from the user of the computing system through the second queue based on determining that access requests are pending in the second queue.

6. The method of claim 1, wherein the threshold number of long-latency requests comprises a number indicating a disproportionate amount of requests from the user.

7. The method of claim 1, wherein determining that the counter of long-latency requests for the user over the time window exceeds the threshold number of long-latency requests comprises determining that the counter of long-latency requests for the user over the time window exceeds the threshold number indicating that throttling or load balancing will be applied on a user-unaware basis.

8. The method of claim 1, further comprising processing received computing resource access requests from other users of the computing system as requests from the other users are received in the first queue.

9. The method of claim 1, wherein the second queue comprises a rate-controlled queue for multiple users of the computing system including the user.

10. The method of claim 1, wherein the defined rate comprises a dynamically adjustable rate based on the measured computing access metrics for the user of the computing system and computing system utilization information.

11. A system, comprising:
a memory having executable instructions stored thereon; and
a processor configured to execute the executable instructions in order to cause the system to:
measure computing resource access metrics over a time window for a user of a computing system based on measuring a number of computing resource access requests received for the user and a processing time for each computing resource access request;
in response to a latency for a computing resource access request of the number of computing resource access requests exceeding a threshold time, increment a counter of long-latency requests for the user over the time window;
determine that the counter of long-latency requests for the user over the time window exceeds a threshold number of long-latency requests;
based on determining that the counter of long-latency requests for the user over the time window exceeds the threshold number of long-latency requests, migrate computing resource access requests from the user of the computing system from a first queue to a second queue, wherein the first queue comprises a rate-unlimited queue and the second queue comprises a rate-controlled queue having a defined rate for processing received requests; and
process computing resource access requests from the user of the computing system based on the defined rate for processing received requests.

12. The system of claim 11, wherein the processor is further configured to cause the system to:
determine that a counter of long-latency requests for the user over a second time window is below the threshold number of long-latency requests; and
migrate computing resource access requests from the user of the computing system from the second queue to the first queue based on determining that the counter of long-latency requests for the user over the second time window is below the threshold number of long-latency requests.

13. The system of claim 11, wherein in order to migrate access computing resource access requests from the user of the computing system from the first queue to the second queue, the processor is configured to cause the system to migrate the computing resource access requests for a duration associated with a timer.

14. The system of claim 13, wherein the processor is further configured to cause the system to:
at an expiry time for the timer, determine that the second queue is empty; and
migrate computing resource access requests from the user of the computing system from the second queue to the first queue based on determining that the second queue is empty.

15. The system of claim 13, wherein the processor is further configured to cause the system to:
at an expiry time for the timer, determine that access requests are pending in the second queue; and
maintain processing of computing resource access requests from the user of the computing system through the second queue based on determining that access requests are pending in the second queue.

16. The system of claim 11, wherein the threshold number of long-latency requests comprises a number indicating a disproportionate amount of requests from the user.

17. The system of claim 11, wherein in order to determine that the measured computing access metrics for the user of the computing system exceeds the threshold, the processor is configured to cause the system to: determine that the counter of long-latency requests for the user over the time window exceeds the threshold number indicating that throttling or load balancing will be applied on a user-unaware basis.

18. The system of claim 11, wherein the processor is further configured to cause the system to process received computing resource access requests from other users of the computing system as requests from the other users are received in the first queue.

19. The system of claim 11, wherein the second queue comprises a rate-controlled queue for multiple users of the computing system including the user.

20. The system of claim 11, wherein the defined rate comprises a dynamically adjustable rate based on the measured computing access metrics for the user of the computing system and computing system utilization information.

* * * * *